US008689631B1

(12) United States Patent
Tally et al.

(10) Patent No.: US 8,689,631 B1
(45) Date of Patent: Apr. 8, 2014

(54) HIGH SENSITIVITY MECHANICAL GYRO WITH REDUCED QUADRATURE ERROR (75) Inventors: Charles Tally, San Diego, CA (US); Richard L. Waters, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 369 days.

(21) Appl. No.: 13/167,539

(22) Filed: Jun. 23, 2011

(51) Int. Cl.
*G01C 19/56* (2012.01)
(52) U.S. Cl.
USPC ................................... 73/504.12; 73/504.14
(58) Field of Classification Search
USPC ........................................ 73/504.12, 504.14
See application file for complete search history.

(56) References Cited

U.S. PATENT DOCUMENTS

| 5,604,312 | A  | * | 2/1997 | Lutz ............................ 73/504.14 |
| 6,067,858 | A  |   | 5/2000 | Clark et al. |
| 6,250,156 | B1 |   | 6/2001 | Seshia et al. |
| 6,367,786 | B1 |   | 4/2002 | Gutierrez |
| 6,393,913 | B1 |   | 5/2002 | Dyck et al. |
| 6,581,465 | B1 |   | 6/2003 | Waters et al. |
| 6,722,197 | B2 |   | 4/2004 | Knowles |
| 6,763,718 | B1 |   | 7/2004 | Waters et al. |
| 6,952,965 | B2 | * | 10/2005 | Kang et al. ................. 73/504.12 |
| 7,213,458 | B2 |   | 5/2007 | Weber et al. |
| 7,767,483 | B1 |   | 8/2010 | Waters |
| 2007/0144255 | A1 | | 6/2007 | Handrich et al. |
| 2008/0078246 | A1 | | 4/2008 | Li |
| 2009/0223277 | A1 | | 9/2009 | Rudolf et al. |

* cited by examiner

*Primary Examiner* — John Chapman, Jr.
(74) *Attorney, Agent, or Firm* — SPAWAR Systems Center Pacific; Kyle Eppele; J. Eric Anderson (57) ABSTRACT

A gyroscope comprising: a multi-layer substrate, comprising drive spring and sense spring layers; a rigid support structure formed from the substrate; a plurality of drive springs formed in each drive spring layer wherein each drive spring is operatively coupled to the support structure; a drive mass formed from at least one layer of the substrate, wherein the drive mass is coupled to the support structure via the drive springs; a drive mass driver operatively coupled to the drive mass and configured to cause movement of the drive mass with respect to the support structure; a plurality of sense springs formed in each sense spring layer, wherein each sense spring is operatively coupled to the drive mass; and a sense mass formed from at least one layer, wherein the sense mass is coupled to the drive mass via the sense springs.

19 Claims, 11 Drawing Sheets

HIGH SENSITIVITY MECHANICAL GYRO WITH REDUCED QUADRATURE ERROR

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 100849.

BACKGROUND OF THE INVENTION

Current accurate inertial sensors are expensive and cumbersome. Inexpensive inertial sensors are prone to be inaccurate. Others have attempted to increase sensitivity of gyroscopes to Coriolis forces by matching to a very high degree the resonant frequencies of the orthogonal drive and sense axes of the gyroscope. In addition, very high mechanical quality factors are desired to achieve increased sensitivity. Both resonant mode matching of the drive/sense mass suspension systems and high mechanical Q designs suffer from increased sensitivity to mechanical pressure variations and ambient temperature fluctuations which can cause a time dependent drift of the gyroscope output or change in gyroscope sensitivity. Quadrature error is the largest common error source in gyroscopes. Quadrature error is due to the unavoidable imperfections of the drive and sense mode spring systems introduced during the fabrication process. Quadrature causes the ideally orthogonal drive and sense mode suspension systems to become coupled. This results in large (undesired) sense mode signals caused by the drive mode operation which corrupts the small (desired) signals caused by rotation-induced Coriolis forces. Many mechanical gyroscopes utilize a single mass which serves as both the drive and sense mass. Therefore any quadrature error-induced displacements of the drive mass are directly applied to the sense mass. Others have designed single-layer two-mass gyroscopes to decouple the drive and sense mode suspensions. However, for single-layer devices all spring structures are identically thick in one dimension, making it difficult to independently vary the out of plane stiffness of the drive and sense suspensions. Thus, single-layer gyroscopes with out-of-plane drive or sense mode operation are non-ideal. Furthermore, out-of-plane oscillations for gyroscopes with in-plane drive and sense mode operation are uncontrollable. There is a need for an apparatus which provides mechanical suppression of quadrature error for any combination of in-plane and out-of-plane operational modes by allowing full three-axis control of spring suspension geometries. There is a need for an apparatus to overcome these limitations without having to resort to other non-ideal means of increasing sensitivity such as increasing the mechanical Q or mode matching drive and sense axis to a very high degree to suppress quadrature errors which often times are of larger magnitude than the small Coriolis forces one wishes to detect.

SUMMARY

Disclosed herein is a gyroscope comprising a multi-layer substrate, a rigid support, sense and drive masses, a plurality of sense and drive springs, and a drive mass driver. The substrate comprises at least two layers stacked on top of one another in a y-direction. The total thickness of the drive spring layers in the y-direction exceeds the total thickness of the sense spring layers in the y-direction. The rigid support structure is formed out of the substrate. The plurality of drive springs is formed in each drive spring layer and designed to deflect only in an xz-plane that is perpendicular to the y-direction. Each drive spring is operatively coupled to the support structure. The drive mass is formed from at least one layer of the substrate and is coupled to the support structure via the drive springs such that movement of the drive mass with respect to the support structure is substantially restricted to movement in the xz-plane. The drive mass driver is operatively coupled to the drive mass and configured to cause movement of the drive mass in the xz-plane with respect to the support structure. The sense springs are formed in each sense spring layer and are designed to deflect only in the y-direction. Each sense spring is operatively coupled between the support structure and the sense mass. The sense mass is formed from at least one layer of the substrate. The sense mass is coupled to the drive mass via the sense springs such that movement of the sense mass with respect to the drive mass is substantially restricted to movement in the y-direction.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 1A:
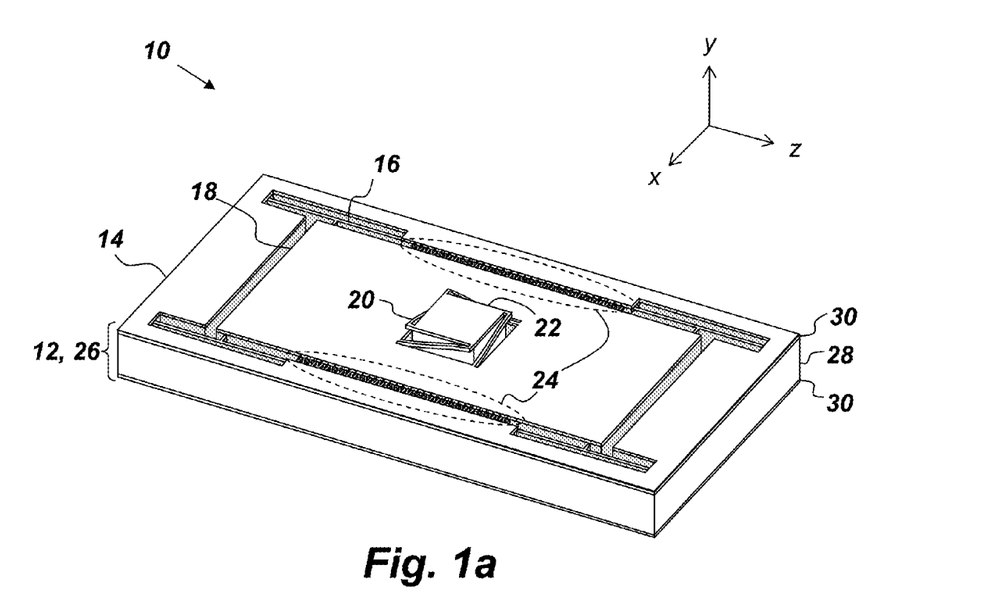
FIG. 1a is a perspective view of a gyroscope.

FIG. 1a is a perspective view of an embodiment of a high-sensitivity mechanical gyroscope 10 with quadrature-error-reducing features. The gyroscope 10 comprises a substrate 12, a rigid support structure 14, a plurality of drive springs 16, a drive mass 18, a plurality of sense springs 20, a sense mass 22, and a drive mass driver 24. The gyroscope 10 may be used to detect rotation of the support structure 14 about a z-axis by measuring Coriolis force-induced displacements of the sense mass 22 along the y-axis due to drive mass velocity along the x-axis induced by the drive mass driver 24. The substrate 12 comprises at least two layers 26 stacked on top of one another in a y-direction. Each layer 26 is either a drive spring layer 28 or a sense spring layer 30. The substrate layers 26 may be any desired size, shape, and thickness, provided, however that the total thickness of the drive spring layers 28 in the y-direction must exceed the total thickness of the sense spring layers 30 in the y-direction. For example, in the embodiment of the gyroscope 10 portrayed in FIG. 1a, there are two thin sense spring layers 30 and a thick drive spring layer 28. Another feature of the gyroscope 10 is that the drive spring layers 28 and the sense spring layers 30 may be alternatingly and symmetrically disposed within the substrate 12. For example, in the embodiment of the gyroscope 10 portrayed in FIG. 1a, the drive spring layer 28 is disposed between the two sense spring layers 30. However, it is to be understood that the gyroscope 10 is not limited to three-layer embodiments and that the substrate 12 may comprise any number of layers 26.

Figure 2A:
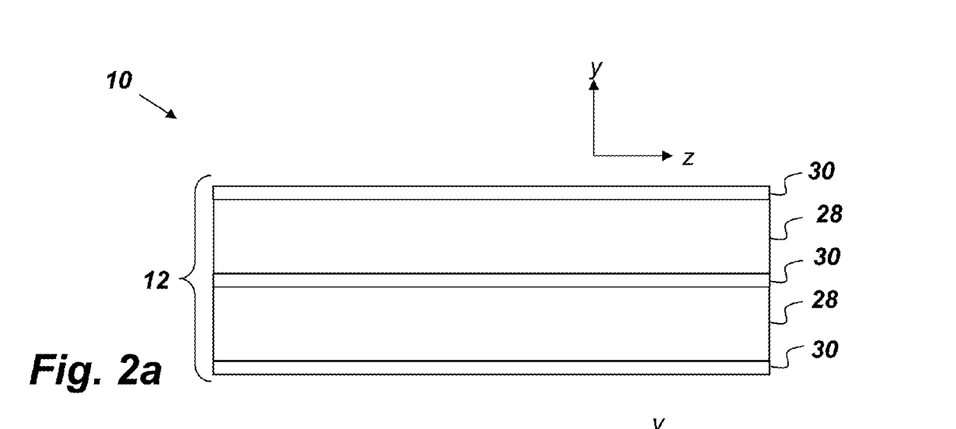
FIGS. 2a-2c are side views of different embodiments of a gyroscope.
Figure 2B:
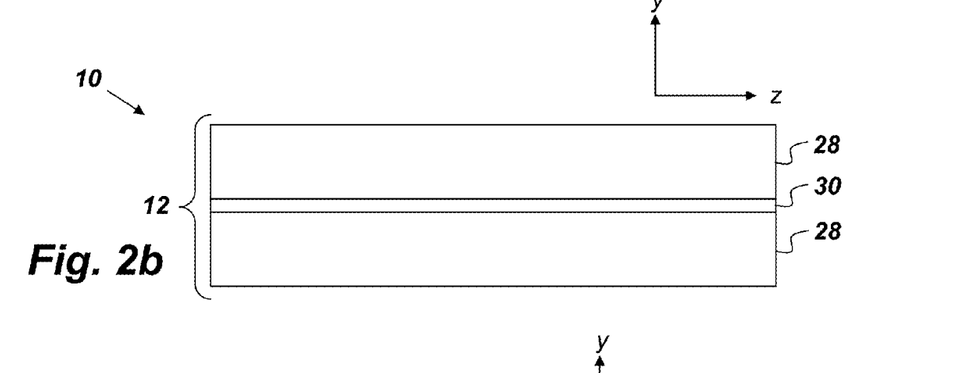
Figure 2C:
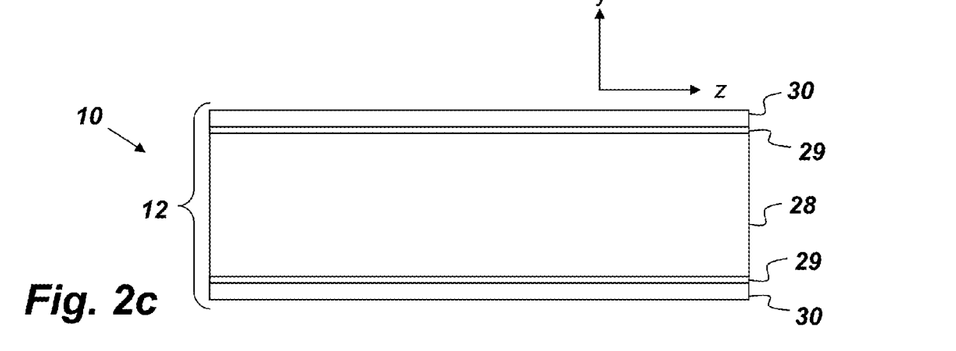

FIGS. 2a-2c are side views of different embodiments of the gyroscope 10. FIG. 2a portrays one embodiment of the gyroscope 10 comprising a total of five layers 26, the uppermost layer 26 being a sense spring layer 30, which is bonded to a drive spring layer 28, which is bonded to another sense spring layer 30, which is bonded to another drive spring layer 28, which is bonded to another sense spring layer 30, which is the lowermost layer. FIG. 2b depicts another embodiment of the gyroscope 10 comprising three layers 26—the uppermost layer 26 being a drive spring layer 28, which is bonded to a sense spring layer 30, which is bonded to another drive spring layer 28. FIG. 2c depicts another embodiment of the gyroscope 10 comprising three layers 26—the uppermost layer 26 being a sense spring layer 30, which is bonded to a drive spring layer 28, which is bonded to another sense spring layer 30. FIG. 2c also shows an isolation film 29 between each of the layers. The isolation film 29 may be added to the top and bottom surface of each layer 26. The isolation film 29 may be any desired thickness to achieve the desired layer-to-layer separation (e.g. thermal isolation, electrical isolation, etc.). For example, in one embodiment, the isolation film may be a buried oxide film with a thickness of approximately 0.5 microns. The isolation film 29 may be any thermal oxide film designed to thermally and electrically isolate two layers 26.

The rigid support structure 14 is formed from the substrate 12 and may be any desired size or shape. In the embodiment of the gyroscope 10 depicted in FIG. 1a, the rigid support structure 14 is etched out of all three layers 24, thus forming a rigid structure along the perimeter of the substrate 12. The drive mass 18 is coupled to the rigid support structure 14 via the plurality of drive springs 16. The sense mass 22, in turn, is coupled to the drive mass 18 via the plurality of sense springs 20.

The plurality of drive springs 16 is formed in each drive spring layer 28. Each drive spring 16 is designed to deflect only in an xz-plane that is perpendicular to the y-direction. The drive springs 16 may be any desired size or shape that substantially limits all movement of the drive mass 18 to the xz-plane and so long as the stiffness of the drive springs 16 in the y-direction is much greater than that of the drive springs 16 in the x- and z-directions and the sense springs 20 in the y-direction. In the embodiment of the gyroscope 10 depicted in FIG. 1a, each drive spring 16 is T-shaped and is formed out of the center drive spring layer 28 such that the "stem" of the "T" is very short compared to the "cross." In this embodiment, the drive mass 18 would be largely restricted to movement in the x-direction, which is within the xz-plane.

The drive mass 18 is formed from at least one layer 26 of the substrate 12. As mentioned above, the drive mass 18 is operatively coupled to the support structure 14 via the drive springs 16 such that movement of the drive mass 18 with respect to the support structure 14 is substantially restricted to movement in the xz-plane. In the embodiment of the gyroscope 10 depicted in FIG. 1a, the drive mass 18 is formed out of all three layers 26 of the substrate 14. The drive mass 18 may be operated in an open-loop or closed-loop manner. In an open-loop system the drive mass 18 is passively driven without monitoring its position or actively controlling its behavior. In a closed-loop system the position of the drive mass 18 is actively monitored, and that data is used to provide feedback to the drive mass driver 24 to alter the behavior of the drive mass 18 as desired.

Figure 3:
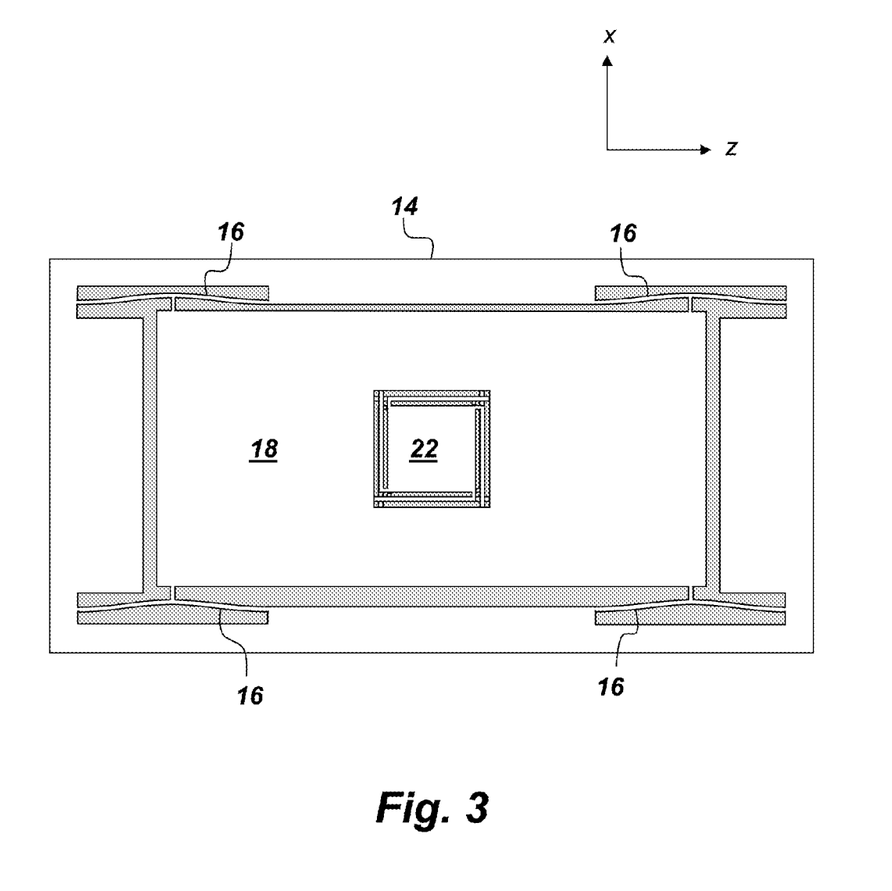
FIG. 3 is a top view of a gyroscope.

FIG. 3 is a top view of an embodiment of the gyroscope 10 showing deflection of the drive springs 16 and corresponding displacement of the drive mass 18 in the xz-plane with respect to the support structure 14.

Figure 1B:
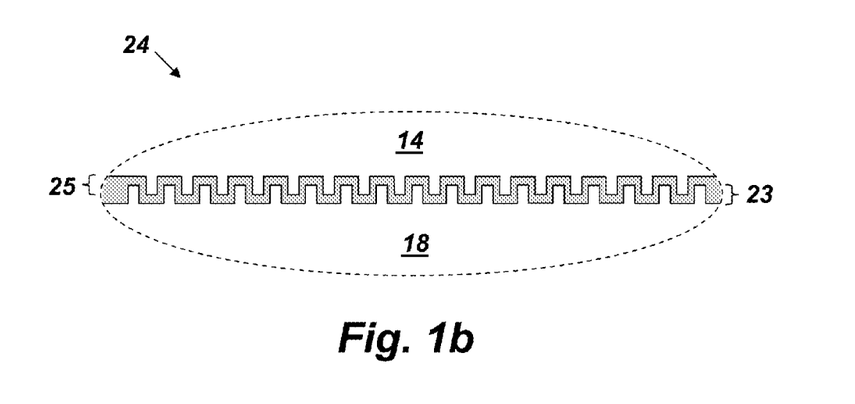
FIG. 1b is a partial top view of a section of a gyroscope.

Referring back to the embodiment of the gyroscope 10 depicted in FIG. 1a, the drive mass driver 24 shown in that embodiment is an electrostatic comb drive formed in the top and bottom sense spring layers 30. FIG. 1b is a partial top view of the drive mass driver 24 depicted in FIG. 1a showing a first half 23 of the comb drive is formed in the portion of the sense spring layer 30 that is part of the drive mass 18. A second half 25 of the comb drive is formed in the portion of the sense spring layer 30 that is part of the support structure 14. However, it is to be understood that the drive mass driver 24 may be any device capable of causing controlled movement of the drive mass 18 in the xz-plane. Suitable examples of the drive mass driver include, but are not limited to variable area actuators, such as electrostatic comb drives, and variable gap actuators, such as parallel plate actuators, as well as other electro-magnetic or piezoelectric mechanisms of actuation. For example, the drive mass drive 24 may comprise a symmetric pair of upper and lower overlapped capacitive electrodes on either side of the drive mass 18 that can be used to create a velocity vector.

The sense springs 20 are formed in the sense spring layers 30 and are designed to deflect only in the y-direction. Each sense spring 20 may be coupled between the drive mass 18 and the sense mass 22. The sense springs 20 may be any desired size, shape, and/or in any configuration that substantially limits all movement of the sense mass 22 to the y-direction. For example, in the embodiment of the gyroscope 10 depicted in FIG. 1a, each sense spring 20 is L-shaped, and FIG. 1a shows the sense springs 20 in a deflected configuration such that the sense mass 22 is displaced in the y-direction with respect to the drive mass 18 and the support structure 14.

The sense mass 22 is formed from at least one layer 26 of the substrate 12. The sense mass 22 is coupled to the drive mass 18 via the sense springs 20 such that movement of the sense mass 22 with respect to the drive mass 18 is substantially restricted to movement in the y-direction, as shown in FIG. 1a. In the embodiment of the gyroscope 10 depicted in FIG. 1a, the sense mass 22 is formed out of all three layers 26 of the substrate 14. The sense mass 22 may be operated in an open-loop or closed-loop manner. For open-loop control scheme, the sense mass 22 is free to move under the influence of external forces. The position is passively measured to implicitly determine the magnitude/direction of the acting force. In a closed-loop system, the sense mass 22 position is controlled to near-zero displacement. Sense mass 22 position-dependant feedback forces are applied which are equal and opposite to the acting force. The nulling feedback force becomes a direct (inverse) measurement of the acting force.

Figures 8A, 8B:
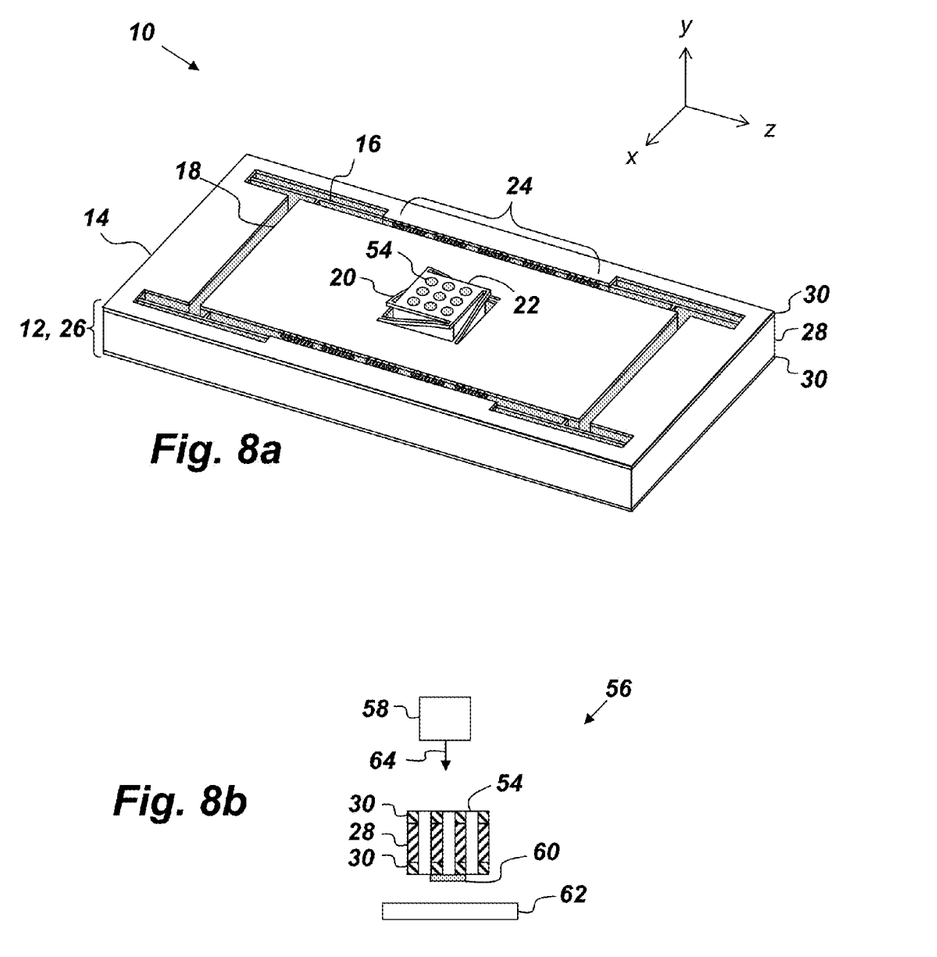
FIG. 8a is a perspective view of another embodiment of a gyroscope.
FIG. 8b is cross-sectional side view of an embodiment of a sense mass transducer.

The operational principle behind the gyroscope 10 is, in many respects, very similar to an accelerometer. The gyroscope 10 may use the same transduction technique as an accelerometer to measure y-axis displacements of the sense mass 22 to determine the net force acting on the sense mass 22. Unlike with an accelerometer, however, which measures inertial forces caused by the support structure of the accelerometer undergoing external acceleration, the gyroscope 10 measures Coriolis forces caused by the rigid support structure 14 undergoing external rotation. Thus, the gyroscope 10 can correlate an input angular rotational rate to the output of a sense mass transducer, described below and an embodiment of which is shown in FIG. 8b, which is configured to measure the displacement of the sense mass 22 in the y-direction. The sense mass transducer may be any device capable of measuring the displacement of the sense mass 22 such as optical, optical resonant, capacitive, tunneling, and switched tunneling devices.

To measure rotations of the support structure 14 oriented about the z-axis, for example, the Coriolis force in the y-direction needs to be measured. This is because Coriolis forces in the y-direction exist when: 1) the drive mass 18 has a non-zero velocity in the x-direction ($\vec{v}_x$) with respect to the support structure 14; and 2) the support structure 14 is rotating at some rate about the z-axis ($\vec{\Omega}_z$). Specifically, the magnitude of this Coriolis force on the drive mass 18 ("m"), represented in equation (1) below is then:

$$|\vec{F}_y| = 2m|\vec{v}_x||\vec{\Omega}_z| \qquad \text{Eq. 1}$$

For example, in order to induce measurable Coriolis forces in the embodiment of the gyroscope 10 depicted in FIG. 1, the drive mass 18 is driven back and forth sinusoidally in the x-direction by the drive mass driver 24, which in this embodiment comprises electrostatic comb drives located on either side of each sense spring layer 30. In this embodiment, the voltage sources applied to the second halves 25 of the comb drive that are opposed to opposite sides of the drive mass 18 may be sine waves, 180 degree out of phase respectively— each of amplitude $V_{AC}$ and at the mechanical resonant frequency of the drive springs 16 ($\omega_D$) in the x-direction. Additionally, in this embodiment the voltage source applied to the first halves 23 of the comb drives located on either side of the drive mass 18 is a fixed constant voltage ($V_{DC}$). In this configuration, the combined force F(t) on the drive mass 18 from the comb drives is:

$$F(t) = 2\varepsilon_0 \frac{NT}{G} V_{DC} V_{AC} \sin(\omega_D \cdot t) \qquad \text{Eq. 2}$$

where N is the number of comb drive teeth per pairs side, G is the separation between neighboring comb teeth, and T is the thickness of each sense spring layer 30 in the y-direction.

The drive mass driver 24-induced sinusoidal oscillation of the drive mass 18 (in the x-direction) gives a sinusoidal dependence to $\vec{v}_x$, which in turn creates a sinusoidal Coriolis force (also at drive mode frequency) on the drive mass 18 and the sense mass 22 in the y-direction. It is these Coriolis forces that cause small oscillations in the sense mass 22 which may be measured to generate a correlation between transducer output voltage and input angular rotation. This interaction can be modeled analytically as a set of coupled, damped harmonic oscillator equations, so long as the drive motion and sense motion oscillations are truly well isolated from one another. To achieve this end, two independent suspension systems (i.e. the drive springs 16 and the sense springs 20) are employed.

Figure 4:
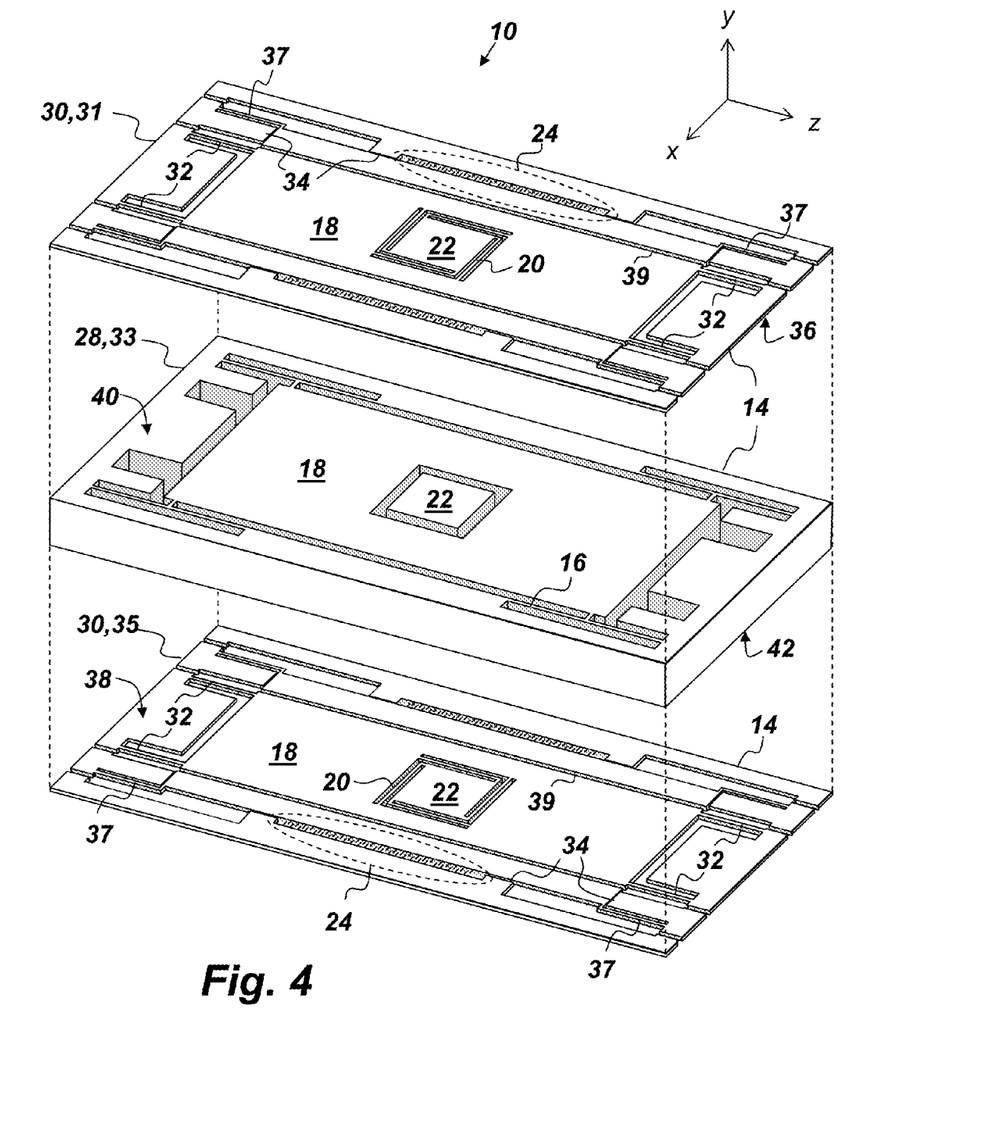
FIG. 4 is an expanded perspective view of an embodiment of a gyroscope.

FIG. 4 is an expanded view of an example embodiment of the gyroscope 10, having a top layer 31, a middle layer 33, and a bottom layer 35 all made of silicon. It is to be understood that the layers 26 may be made of any desired material and are not limited to silicon. The top layer 31 is a sense spring layer 30, the middle layer 33 is a drive spring layer 28, and the bottom layer 35 is a sense spring layer 30. While not shown in FIG. 4, an isolation film 29 may be disposed between the top layer 31 and the middle layer 33 as well as between the bottom layer 35 and the middle layer 33. In this embodiment, the drive springs 16 comprise four drive-mode T-shaped springs located in the corners of the gyroscope 10 which are etched through the middle layer 33, which, in this embodiment, is approximately 260 µm thick. The drive springs 16 have a mechanical resonance of approximately 9.949 kHz in the x-direction and are very rigid in the y- and z-directions. It is the drive springs 16 and the drive mass 18 which are actuated back and forth at their resonant frequency via the drive mass driver 24. The sense springs 20 comprise a set of eight sense-mode L-shaped springs located in the center of the drive mass 18 and are etched through both the top and bottom layers 31 and 35 respectively, which in this embodiment are approximately 30 µm thick each. The sense springs 20 have a mechanical resonance of approximately 10.033 kHz in the y-direction and are very rigid x- and z-directions. It is the sense springs 20 which are driven by the Coriolis force induced by x-axis actuation and external rotation of the support structure 14 about the z-axis. The resultant Coriolis displacements in the sense mass 22 may be measured via a transducer of choice and from feedback via an applied electrostatic force to stabilize the y-direction motion of the sense mass 22 via a closed-loop controller.

In the embodiment of the gyroscope 10 depicted in FIG. 4, the top and bottom layers 31 and 35 each further comprise four grounding tethers 32, which are etched into the sides of the top and bottom layers 31 and 35. The purpose of the grounding tethers 32 is to provide an electrical connection between a portion of the sense spring layer 30 that forms part of the rigid support structure 14 and the portion of the sense spring layer 30 that forms part of the drive mass 18. Furthermore, the sense springs 20 also serve as electrical tethers to provide connection between the portion of the sense spring layer 30 that forms part of the drive mass 18 and the portion of the sense spring layer 30 that forms part of the sense mass 22. The grounding tethers 32 may be used to ground the portions of the sense spring layer 30 that are part of the sense mass 22 and the drive mass 18 to prevent charge build up over time from capacitive force controlling of the otherwise electrically isolated drive and sense masses 18 and 22. The grounding tethers 32 should be positioned so as not to interfere with drive springs 16 formed in the drive spring layer 18 or other structures formed in the sense spring layers 20 such as comb teeth or mechanical hard stops 34.

Additionally, in the embodiment of the gyroscope 10 depicted in FIG. 4, the top and bottom layers 31 and 35 each further comprise four comb drive tethers 37, which are etched into the corners of the top and bottom layers 31 and 35. The comb drive tethers 37 are needed to connect a portion of the sense spring layer 30 that is part of the rigid support structure 14 and the portion of the sense spring layer 30 which forms the portions of comb drive attached to the drive mass 18. The comb drive tethers 37 are required for the aforementioned scheme in operating the drive mass driver 24. Electrical isolation trenches 39 may also be formed in a sense spring layer 30 by etching narrow trenches through the sense spring layer 30 silicon to electrically isolate separate portions of the sense spring layer 30 silicon. For example, in the embodiment of the gyroscope 10 wherein the drive mass driver 24 comprises electrostatic comb drives in the sense spring layers 30, the electrostatic comb drives can be electrically isolated from the sense springs 20 using electrical isolation trenches 39. Referring back to the embodiment of the gyroscope 10 depicted in FIG. 4, eight mechanical hard-stop tabs 34 may be implemented for shock prevention within the top and bottom layers 31 and 35 that will mechanically prevent the drive mass 18 from displacing any further than approximately 15 μm in the x-direction, or approximately 2.0 μm in the z-direction, which prevents the comb teeth from colliding in either direction. The hard stops 34 may be fabricated in any of the desired layers 26. For example, the hard stops 34 may be formed out of the sense spring layers 30, as depicted in FIG. 4, in a drive spring layer 18, and/or in all the layers 26 of the substrate 12.

Figure 5A:
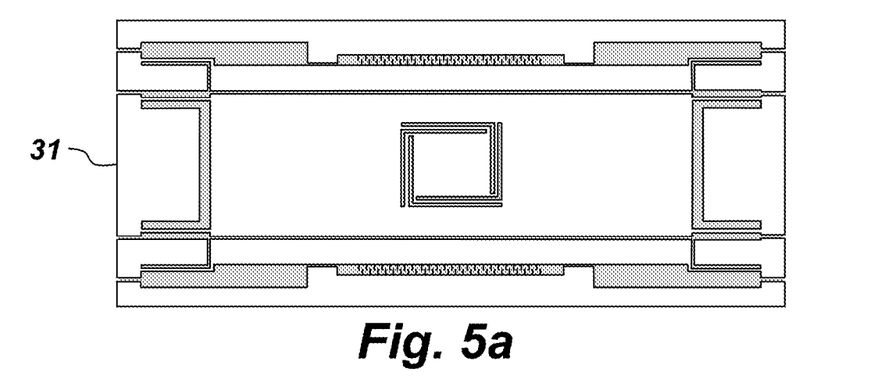
FIGS. 5a-5c are top views of different layers of a gyroscope.
Figure 5B:
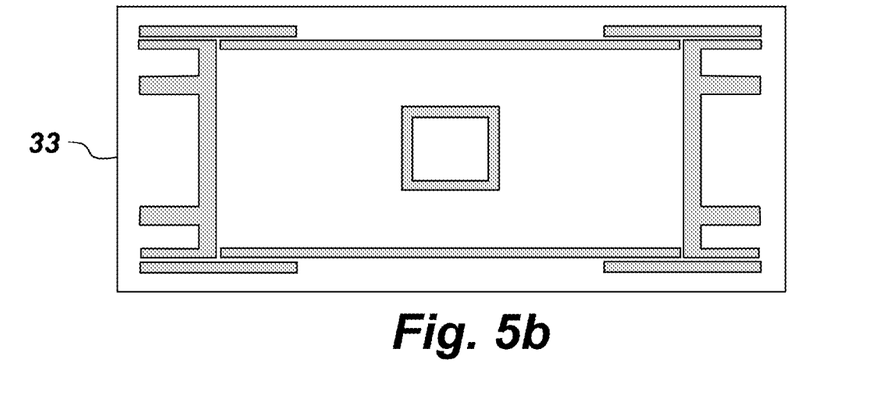
Figure 5C:
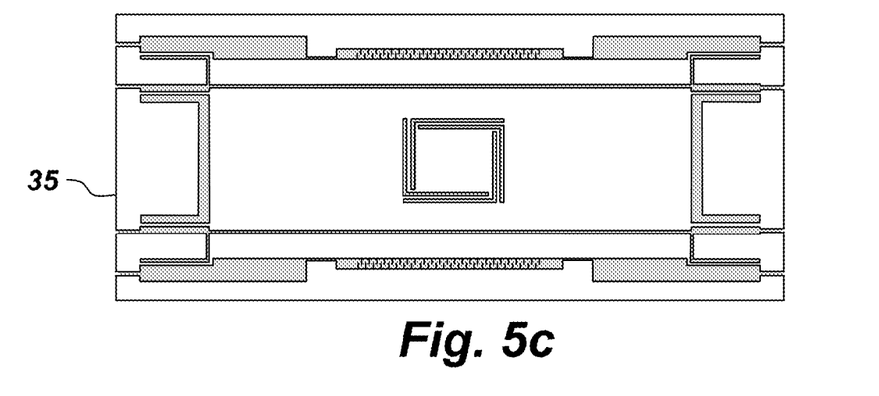

FIGS. 5a-5c are top views of the top, middle, and bottom layers 31, 33, and 35 from FIG. 4. Note that, in this embodiment, the bottom layer 35 is a top-to-bottom and side-to-side mirror image of the top layer 31. One way to accomplish this configuration is to fabricate two substantially identical sense spring layers 30 (i.e. the top and bottom layers 31 and 35) using the same etching process. Then one may bond a lower surface 36 of the top layer 31 and a lower surface 38 of the bottom layer 35 to upper and lower surfaces 40 and 42 of the middle layer 33, respectively, as shown in FIG. 4. In this manner, any asymmetries in the comb teeth or other features of the top and bottom layers 31 and 35 due to the fabrication process will be cancelled out. Additionally, this mirroring results in a system of sense mass springs 20 which favor sense mass 22 displacement purely in the y-direction without any rotation or twisting of the sense mass 22 in any direction.

The overall mechanical sensitivity of the gyroscope 10, in units of sense mass 22 displacement per external rotation of the support structure 14 (in meters/degree/second), may be expressed as follows:

$$\frac{y_{sense}}{\Omega_{ext}} = 2x_0 \frac{Q'_y}{\omega_y} \frac{m_d}{m_s} \qquad \text{Eq. 3}$$

where $x_0$ is the peak amplitude of actuation of the drive mass 18 due to the drive mass driver 24, $m_d$ and $m_s$ are the masses of the drive mass 18 and the sense mass 22 respectively, $\omega_y$ is the resonant angular frequency of the sense mode suspension system composed of sense springs 20 and the sense mass 22, and $Q'_y$ is the effective quality factor given by:

$$Q'_y = \frac{Q_y}{\sqrt{1 + Q_y^2 (\Delta/\mu)}} \text{ where } \Delta \equiv \omega_y - \omega_x, \mu \equiv \frac{\omega_y \omega_x}{\omega_y + \omega_x} \qquad \text{Eq. 4}$$

$\omega_x$ is the resonant angular frequency of the drive mode suspension composed of drive springs 16 and the drive mass 18, and $Q_y$ is the packing pressure dependant quality factor of damped oscillations in the sense direction. Exploiting the drive/sense mass ratio to increase mechanical sensitivity as is outlined herein can be applicable to gyroscopes 10 with rotational actuation as well as those with linear actuation.

In the embodiment of the gyroscope 10 depicted in FIG. 4, the electrostatic comb drives were designed to give a peak actuation amplitude of no more than $x_0$=15 μm. This value was chosen to increase mechanical sensitivity, while limiting the peak stresses within the drive springs to under one Giga-Pascal (GPa) ($10^9$ N/m$^2$), which is safely below the yield strength of crystalline Silicon (~7-9 GPa). For example, in the embodiment of the gyroscope 10 depicted in FIG. 4, the drive mass 18 is approximately 6.67 times greater than the sense mass 22. Regarding the effective quality factor $Q'_y$, this parameter is maximal when the drive and sense resonant mechanical frequencies are substantially equal. That is, for the packaging pressure of 2-10 mTorr, when $\omega_y = \omega_x$ then $Q'_y \rightarrow Q_y \approx 20,000$. However, if the drive and sense mode frequencies are substantially matched, and any variation in either frequency over time occurs (due to temperature fluctuations, spring fatigue, etc.), the result is a highly non-linear change in system output behavior. By making the sense mode resonance 50-1000 Hz greater than that of the drive mode, an effective quality factor of $Q'_y$=5-100 can still be obtained to increase the mechanical sensitivity, while maintaining a stable/linear system response even if the two mechanical resonances drift slightly over time. As a result of the multi-layer design of the gyroscope 10, the sense springs 20 and the drive springs 16 may be fabricated in separate process steps and may be varied independently of one another in order to achieve any desired level of sense-drive axis mode-matching.

Figure 6:
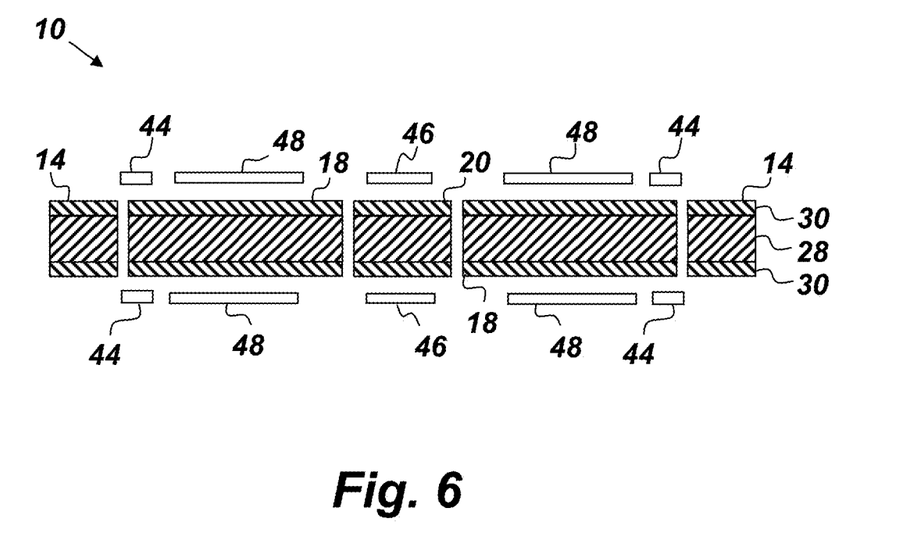
FIG. 6 is a cross-sectional side view of an embodiment of a gyroscope.

FIG. 6 is a cross sectional side view of an alternative embodiment of the gyroscope 10, which comprises quadrature detectors 44, which are disposed to sense motion of the drive mass 18 relative to the support structure 14 in the y-direction. The quadrature detectors 44 may detect both vertical (y-direction) and lateral (xz-plane) motion of the drive mass 18 depending on their configuration. If the quadrature-induced vertical motion (y-direction) of the drive mass 18 is to be detected, then the quadrature detectors 44 should be placed above and below the drive mass 18 such that the overlap area between the quadrature detectors 44 and the drive mass 18 does not change during drive mode actuation. The capacitive difference between upper and lower quadrature detectors 44 can be used to generate a signal which is in phase with the quadrature-induced vertical displacements of the drive mass 18 caused by quadrature forces. If the lateral drive motion (xz-plane) of the drive mass is to be measured, then the quadrature detectors 44 should be placed above and below the drive mass 18 such that the overlap area between the quadrature detectors 44 and the drive mass 18 changes linearly during drive mass 18 actuation. In this case, the capacitive signal coming off each quadrature detector 44 is in phase with the drive mass 18 position—and is thus proportional to the quadrature forces in the system. In the embodiment of the gyroscope 10 where the drive mass driver 24 comprises comb drives, in addition to driving the drive mass 18, the comb drives may also be used to monitor the position of the drive mass 18. Based on outputs received from either the drive mass driver 24 or the quadrature detectors 44, sense mass control electrodes 46 and drive mass control electrodes 48 may be used to apply electrostatic quadrature-opposing forces to both the sense and drive masses 20 and 18 respectively. The quadrature detectors 44, the sense mass control electrodes 46, and the drive mass control electrodes 48 may be disposed on the rigid packaging of the gyroscope 10, not shown. Any remaining quadrature error will be apparent in the output of the sense mass transducer, but will be 90 degrees out of phase with the desired Coriolis signal. Thus, the remaining quadrature error can be removed, thus isolating the Coriolis signal, via demodulation and the external rotation rate can then be isolated from the Coriolis signal via subsequent amplitude demodulation during signal processing.

Figure 7:
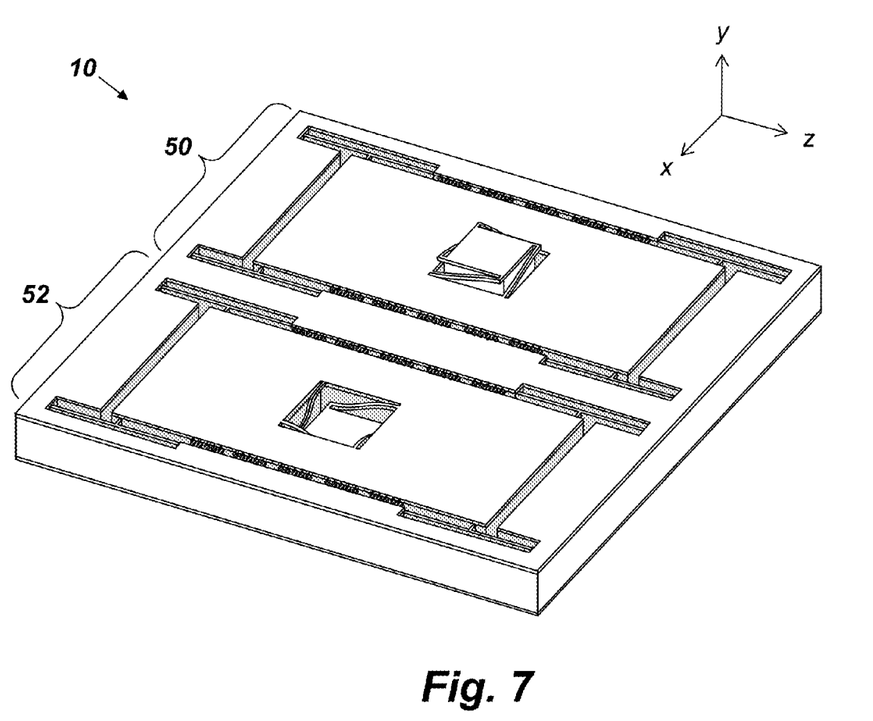
FIG. 7 is a perspective view of another embodiment of a gyroscope.

FIG. 7 is a perspective view of another embodiment of the gyroscope 10 where the support structure 14 supports first and second element sets 50 and 52. The first set of elements 50 comprises all the elements from the embodiment of gyroscope 10 shown in FIG. 1a. The second set of elements 52 also comprises all the elements from the embodiment of gyroscope 10 shown in FIG. 1a, but differs from set 50 in that the drive mass 18 of the second set 52 is configured to oscillate 180-degrees out of phase with the drive mass 18 of the first set 50. This results in Coriolis forces and sense mass 22 oscillations that are both 180-degrees out of phase with respect to one another and is useful for subtracting off common-mode noise between the two element sets 50 and 52.

FIGS. 8a-8b illustrate another embodiment of the gyroscope 10. FIG. 8a is a perspective view of the gyroscope 10 wherein the sense mass 22 comprises through-holes 54, which can serve to reduce damping and at least one such hole opens the light path required for an electro-optical embodiment of the sense mass transducer 56. Any desired number or geometric configuration of through-holes 54 may be added to the sense mass 22 or to the drive mass 18 for that matter. The through-holes 54 can serve to reduce squeeze film damping as well as slide film damping and increase the mechanical quality factor. FIG. 8b is a depiction of an optical embodiment of the sense mass transducer 56 comprising an optical interrogation device configured to optically monitor displacement of the sense mass 22 in the y-direction. In this embodiment, the sense mass transducer 56 comprises a radiation source 58, and first and second reflective surfaces 60 and 62. The first reflective surface 60 is disposed on the bottom of the sense mass 22 and spans across at least one of the through holes 54 in the sense mass 22. The second reflective surface 62 is disposed on the rigid packaging of the gyroscope 10, not shown. The radiation source 58 is configured to direct a light signal 64 through the through-holes 54.

Figure 9:
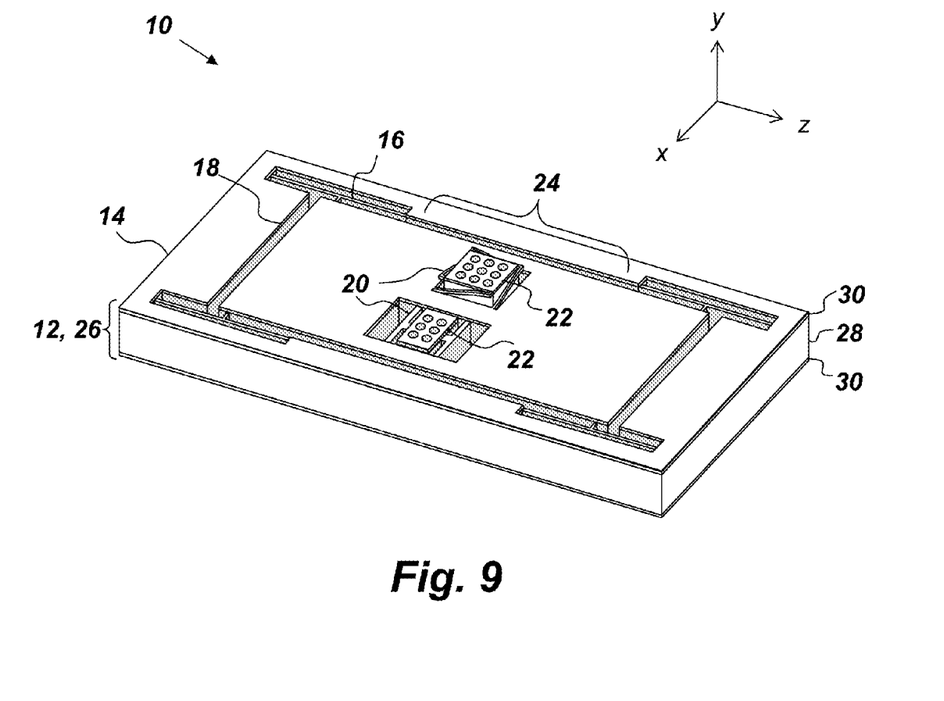
FIG. 9 is a perspective view of another embodiment of a gyroscope.

FIG. 9 is a perspective view of another embodiment of the gyroscope 10 having two sense masses 22 and/or drive masses 18. In embodiments of the gyroscope 10 having multiple sense masses 22, each sense mass 22 may be designed to react to one of two orthogonal Coriolis forces generated by the drive mass 18. One gyroscope 10 may therefore sense two orthogonal rotational rates. In embodiments of the gyroscope 10 having multiple drive masses 18, each drive mass 18 may be designed to actuate in opposite directions from each other such that each drive mass 18 measures the same inertial accelerations but opposite Coriolis forces and the two drive masses 18 could be used together to isolate Coriolis signals from inertial force signals.

Figure 10:
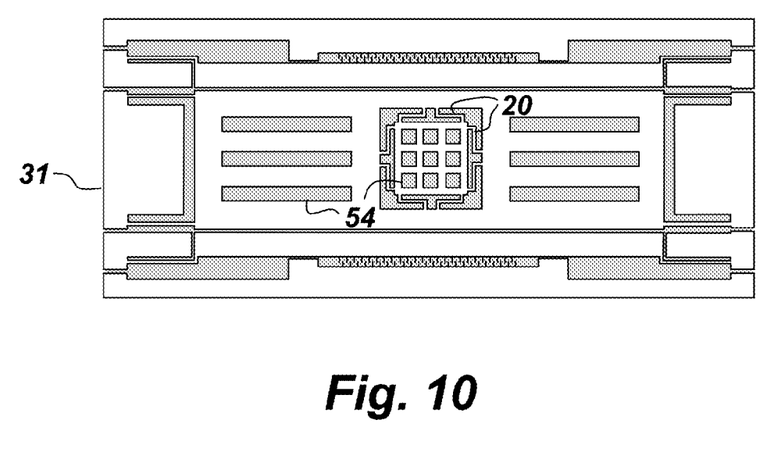
FIG. 10 is a top view of another embodiment of a layer of a gyroscope.

FIG. 10 is a top view of another embodiment of the top layer 31 wherein each sense springs 20 comprises two right angles. Also shown in this embodiment are through holes 54 in the drive mass 18.

Figure 11:
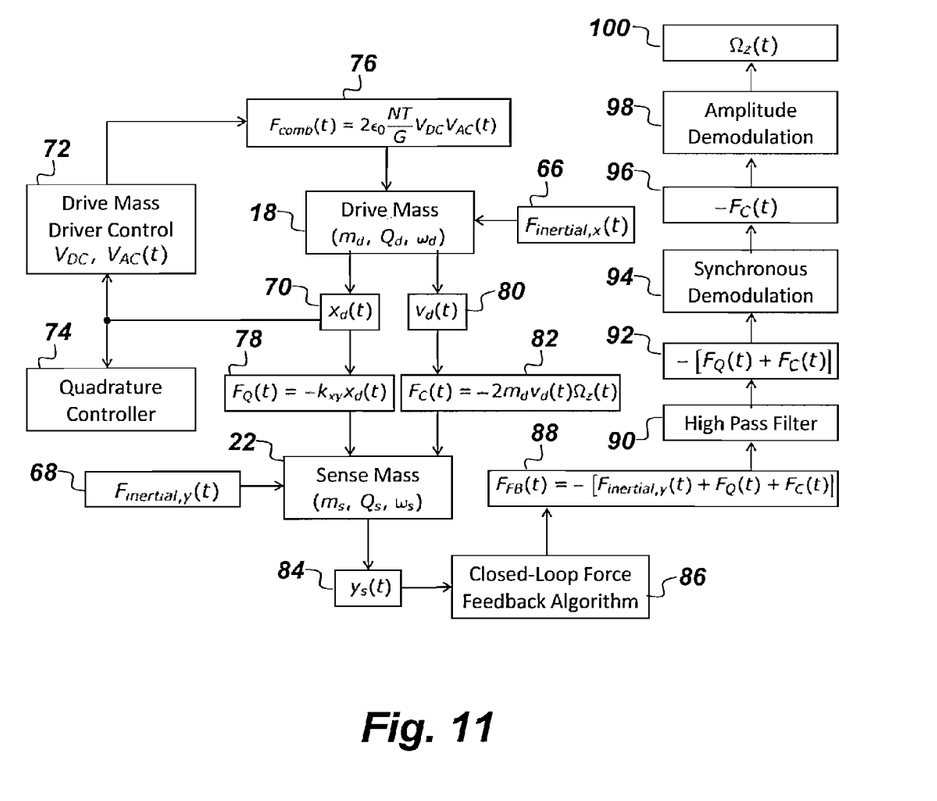
FIG. 11 is a block diagram of a gyroscope.

FIG. 11 is a high-level system block diagram showing the operation of one embodiment of the gyroscope 10. The block diagram shows an external force 66 in the x-direction acting on the drive mass 18 and an external force 68 in the y-direction acting on the sense mass 22. Element 70 represents the displacement of the drive mass 18 in the x-direction, which feeds into a drive mass driver controller 72 and an optional quadrature controller 74. Based on the displacement of the drive mass 18 in the x-direction, the drive mass driver controller 72 applies a drive force 76 to the drive mass 18. In the embodiment shown, the drive mass driver 24 is a set of comb drives and the drive force 76 is a force applied to the comb drive teeth. The quadrature force 78 is a function of the displacement of the drive mass 18 in the x-direction. Element 80 represents the velocity of the drive mass 18 in the x-direction. The Coriolis force 82 is a function of the velocity of the drive mass 18 in the x-direction and the external rotation ($\Omega_z$) of the gyroscope 10 about the z-axis. The sense mass 22, by nature of its connection to the drive mass 18, experiences the same displacement and velocity in the x-direction as the drive mass 18. Element 84 represents the displacement of the sense mass 22 in the y-direction, which is fed into a closed-loop force feedback algorithm 86, which generates a feedback force 88 that may be applied to the sense mass 22. The feedback force 88 may also pass through a high pass filter 90 where low-frequency inertial forces are filtered out—producing a filtered signal 92. Element 94 represents the synchronous demodulation of the filtered signal 92, which results in an isolated signal 96. The isolated signal 96 is subjected to amplitude demodulation 98, which results in the external rotation 100 of the gyroscope 10 about the z-axis as a function of time.

From the above description of the gyroscope 10, it is manifest that various techniques may be used for implementing the concepts of the gyroscope 10 without departing from its scope. The described embodiments are to be considered in all respects as illustrative and not restrictive. It should also be understood that gyroscope 10 is not limited to the particular embodiments described herein, but is capable of many embodiments without departing from the scope of the claims.

We claim:

1. A gyroscope comprising:
    a substrate comprising at least three layers stacked on top of one another in a y-direction, wherein each layer is either a drive spring layer or a sense spring layer, and wherein the total thickness of the drive spring layers in the y-direction exceeds the total thickness of the sense spring layers in the y-direction, and the drive spring layers and the sense spring layers are alternatingly and symmetrically disposed within the substrate;
    a rigid support structure formed from the substrate;
    a plurality of drive springs formed in each drive spring layer and designed to deflect only in an xz-plane that is perpendicular to the y-direction, wherein each drive spring is operatively coupled to the support structure;
    a drive mass formed from at least one layer of the substrate, wherein the drive mass is coupled to the support structure via the drive springs such that movement of the drive mass with respect to the support structure is substantially restricted to movement in the xz-plane;
    a drive mass driver operatively coupled to the drive mass and configured to cause movement of the drive mass in the xz-plane with respect to the support structure;
    a plurality of sense springs formed in each sense spring layer and designed to deflect only in the y-direction, wherein each sense spring is operatively coupled to the drive mass; and
    a sense mass formed from at least one layer, wherein the sense mass is coupled to the drive mass via the sense springs such that movement of the sense mass with respect to the drive mass is substantially restricted to movement in the y-direction.

2. The gyroscope of claim 1, wherein the drive mass driver comprises a set of electrostatic comb-drives formed in top and bottom layers of the substrate, wherein the electrostatic comb-drives are configured to cause linear oscillation in the xz-plane of the drive mass with respect to the support structure.

3. The gyroscope of claim 2, wherein each sense spring layer further comprises electrical comb-drive tethers configured to electrically couple each half of each comb drive to the rigid structure.

4. The gyroscope of claim 3, wherein at least one of the layers comprises mechanical hard stop features configured to limit motion of the drive mass with respect to the support structure such that teeth of the comb-drives are prevented from making physical contact with each other.

5. The gyroscope of claim 1, further comprising an isolation film disposed between each layer such that the isolation film electrically and thermally isolates each layer from the other layers.

6. The gyroscope of claim 1, wherein the sense spring layers and the drive spring layer are made of silicon.

7. The gyroscope of claim 1, wherein the substrate comprises three layers including a top layer, a bottom layer, and a middle layer, and wherein the top and bottom layers are drive spring layers and the middle layer is a sense spring layer.

8. The gyroscope of claim 1, wherein the substrate comprises five layers including a sense spring layer as a first layer, a drive spring layer as a second layer, a sense spring layer as a third layer, a drive spring layer as a fourth layer, and a sense spring layer as a fifth layer, wherein the second layer is disposed between the first and third layers and wherein the fourth layer is disposed between the third and fifth layers.

9. The gyroscope of claim 1, further comprising a second gyroscope formed out of the same substrate as the gyroscope of claim 1, wherein the second gyroscope is substantially identical to the gyroscope of claim 1 with the exception that the drive mass of the second gyroscope is configured to oscillate 180-degrees out of phase with the drive mass of the gyroscope of claim 1.

10. The gyroscope of claim 1, further comprising an optical interrogation device configured to optically monitor displacement of the sense mass in the y-direction.

11. The gyroscope of claim 1, wherein the thickness and design of the sense and drive springs are configured to reduce quadrature error such that the quadrature error of the gyroscope is controlled mechanically without using electrical quadrature reduction means.

12. A gyroscope comprising:
a three-layer silicon substrate comprising a top layer, a middle layer, and a bottom layer that is substantially identical to the top layer, wherein the three layers are stacked and bonded to each other in a y-direction with a thermal and electrical isolating film between each layer, wherein the thickness of the middle layer in the y-direction exceeds the combined thickness of the top and bottom layers in the y-direction, and wherein the substrate further comprises:
a rigid support structure formed out of all three substrate layers;
a plurality of drive spring members formed out of the middle layer, wherein a first end of each drive spring member is coupled to the rigid support structure;
a drive mass formed out of all three substrate layers, wherein the drive mass is coupled to a second end of each drive spring member such that movement of the drive mass with respect to the support structure is substantially restricted to movement only in an x-direction;
a drive mass driver formed out of the substrate and operatively coupled to the support structure and the drive mass, wherein the drive mass driver is configured to cause sinusoidal oscillation of the drive mass in the x-direction;
a plurality of sense spring members formed out of the top and bottom layers, wherein a first end of each sense spring member is coupled to the drive mass; and
a sense mass formed out of all three substrate layers and coupled to a second end of each sense spring member such that movement of the sense mass is substantially restricted to movement only in a y-direction.

13. The gyroscope of claim 12, wherein each of the three layers comprises an upper and a lower surface, and wherein the lower surface of the top layer is bonded to the upper surface of the middle layer and the lower surface of the bottom layer is bonded to the lower surface of the middle layer.

14. The gyroscope of claim 13, wherein the drive mass driver comprises a set of electrostatic comb-drives formed in the top and bottom layers.

15. The gyroscope of claim 14, wherein the drive spring members are T-shaped and the sense spring members are L-shaped.

16. The gyroscope of claim 15, wherein the top and bottom layers further comprise an electrical tether configured to electrically connect the rigid support structure to the drive mass.

17. The gyroscope of claim 16, wherein at least one of the layers comprises mechanical hard stop features configured to limit motion in the x-direction and in a z-direction such that teeth of the comb-drives are prevented from making physical contact with each other.

18. The gyroscope of claim 17, wherein the top and bottom layers have a thickness of approximately 30 microns and the middle layer has a thickness of approximately 400 microns.

19. The gyroscope of claim 18, further comprising electrical quadrature reduction means operatively coupled to the drive mass.

* * * * *